Figure 1:
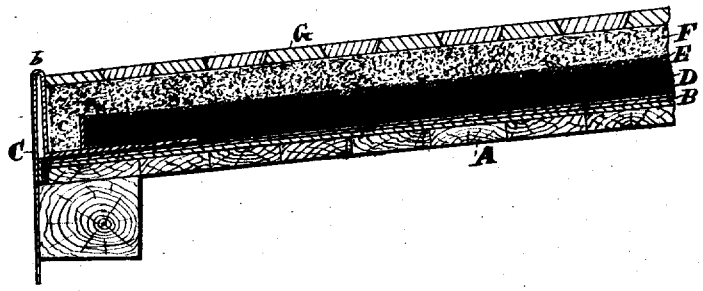
Figure 11:
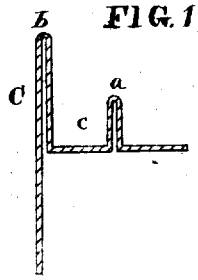

S. L. FOSTER & W. H. BENTON.

Composite Roof.

No. 9,314. Reissued July 20, 1880.

WITNESSES.

Jno. B. Lobee

J. O. Warren

INVENTORS.

Samuel L. Foster

William H. Benton.

UNITED STATES PATENT OFFICE.

SAMUEL L. FOSTER AND WILLIAM H. BENTON, OF PHILADELPHIA, PA.

COMPOSITE ROOF.

SPECIFICATION forming part of Reissued Letters Patent No. 9,314, dated July 20, 1880.

Original No. 227,682, dated May 18, 1880. Application for reissue filed June 25, 1880.

*To all whom it may concern:*

Be it known that we, SAMUEL L. FOSTER and WILLIAM H. BENTON, of the city and county of Philadelphia, and State of Pennsylvania, have invented certain new and useful Improvements in Composite Roofs, of which the following is a full, clear, and exact description of the invention, sufficient to enable others skilled in the art to which it appertains to make or construct the same.

In the construction of roofs in which hydraulic cement, tile, or brick forms the upper or wearing surface, as heretofore practiced, great difficulty has been experienced on sloping roofs or roofs having a pitch of keeping the bituminous under layer from running down to the stop or barrier at the eaves or edge of the roof and filling it to such an extent as to prevent the laying of the hydraulic-cement layer in which the tiles or bricks are embedded of a uniform or of sufficient thickness at the eaves to hold the tiles or bricks, and the result has been that the cement layer at the point above referred to is so thin that it dries before the cement has properly set, which causes cracks and leakages in the cement layer.

Great trouble and vexatious delay has been experienced heretofore in putting on the cement layer, and having it set so as to form a good surface-coat or [illegible] bed to receive the tiles or bricks, and when the cement layer has been successfully laid it is liable to be broken or cracked at or near the eaves, owing to the great mass of asphaltic or bituminous matter collected at that point, the said asphaltic or bituminous matter being more readily affected by heat and cold than the hydraulic-cement layer. The result is that the cement layer is broken and otherwise injured by the fluctuations or traveling of the asphaltic or bituminous layer.

Various devices have been heretofore resorted to to prevent the tiles, bricks, or slabs from sagging, or from being pressed down at the sides by persons walking thereon.

To prevent the uneven settling, tilting, or pressing down of the sides of the tile, brick, or slab, and to obviate the other defects heretofore referred to, is the object of our present invention.

To this end our invention consists in securing to the lower edge or eaves of the roof a double-celled stop or bracket, which stops or dams off the asphaltic or bituminous layer at a short distance from the eaves of the roof and permits the hydraulic-cement layer to be made thicker and stronger at the eaves.

The invention further consists in making the tiles of hydraulic or other good quick-setting cement and sand.

The invention further consists in the peculiar construction of the tile and the application or embedding of the same in the cement, whereby the edges of the tiles are supported and prevented from becoming tilted and uneven by the pressing down of the edges, as will be more fully explained hereinafter.

To more fully explain and illustrate our invention, reference is made to the accompanying drawings, in which—

Figure 1 is a sectional view, and Fig. 2 is a view in cross-section, of our double stop, which may be formed of one piece of metal, as shown.

A designates the sheathing-boards of an ordinary battened roof, which may or may not be tongued and grooved so as to form a smooth or level upper surface.

B represents three or more layers of roofing felt or paper, saturated or not with natural or artificial asphaltum, and joined or cemented together or not with layers of the same material. We prefer, however, to have the layer of sheets of felt or paper joined together with natural or artificial asphaltum.

The felt or paper is placed and secured on the sheathing-boards or other suitable foundation, so as to have the edges or ends of the same lap down a short distance over the lower edge of the roof, where it is secured to the side of the building in any convenient manner.

C designates the double-stop, which, by preference, is made of sheet metal; but a wooden stop having the same, or substantially the same, construction and function can be employed without departing from the spirit of our invention.

As before stated, the stop C is, by preference, made of sheet metal, and may have the outer or exposed portion of any desired configuration to form an ornamental cornice. It can be made all in one piece, as shown in Fig.

2, or the inner piece or stop, *a*, can be soldered to the main piece or body C, as shown in Fig. 2.

The stop C is secured to the roof and sides of the building, as shown, in any suitable manner after the felt or paper has been applied. The vertical extension of the stop, which is secured to the side of the building, serves to hold the turned-down edges or ends of the felt or paper securely in place.

D is a layer or coat of natural or artificial asphaltum, or any suitable bituminous compound, and is applied above the stop *a*, said stop serving to keep the bituminous or asphaltic layer back from the edge or eaves of the roof.

E is a layer of clean fine gravel, which is embedded into the bituminous layer, and forms a layer of bitumen and gravel about on a level or line with the top of the inner stop, *a*.

A layer of hydraulic cement, F, mixed to the proper consistency, is next applied over the gravel, and is allowed to flow down or is built in, so as to fill the gutter *c* between the stops or projections *a b*, thus forming a heavier bed or border of hydraulic cement or concrete at the edge or eaves of the roof, where strength is most needed, and more effectually damming or stopping the asphaltic layer away from the edge of the roof. While the hydraulic cement or concrete is still in a plastic state the tiles G are placed thereon and embedded therein, as shown.

The tiles G are of the form shown—*i. e.*, their edges are beveled—so that when laid in the cement or concrete with their broad and narrow faces alternately reversed they will support each other, and are less liable to be tilted or loosened by persons walking thereon.

The tiles are made of hydraulic or other good quick-setting cement and sand under pressure, and preferably of the form shown; but other forms may be used without departing from the spirit of our invention.

We have found by actual experience that tiles made of hydraulic or other cement and sand under powerful pressure are of a superior quality and well adapted for roofing and other purposes. They are light in weight, and of almost metallic hardness.

The joints between the tiles, when laid, are filled or sealed with any suitable cement.

Other kinds of tiles—such as clay, glass, metal, &c.—may be laid on the roof as built up by us; but we prefer to use the cement tile, as herein described.

Having thus described our invention, what we claim, and desire to secure by Letters Patent, is—

1. In the construction of composite roofs, the method herein described of preventing the asphaltic or bituminous layer from gathering or massing at the edge or eaves of the roof by stopping said asphaltic or bituminous layer with a metallic or other stop and interposing a barrier of hydraulic cement or concrete between the end or edge of the bituminous or asphaltic layer and the edge or eaves of the roof.

2. In a composite roofing, the inner stop or ledge, *a*, in combination with the asphaltic or bituminous layer or course D, whereby the said layer is prevented from accumulating or piling up at the edge or eaves of the roof.

3. The double stop C, provided with the ledges or projections *a b*, and made or not of one continuous piece of sheet metal, substantially as shown and described.

4. The double stop C, provided with the projections or stops *a b*, in combination with the cement or concrete layer, whereby a strip or body of hydraulic cement or concrete is formed in the groove *c*, at or near the edges or eaves of the roof, substantially as set forth.

5. A tile for roofing and other purposes, composed of hydraulic or other suitable cement and sand, as set forth.

6. A tile for roofing and other purposes, composed of hydraulic or other suitable cement and sand, when formed under pressure, as set forth.

7. In combination with the hydraulic-cement or concrete layer, the beveled-edge tiles G, when laid substantially as shown and described, whereby the tiles are rendered self-supporting and the danger of displacement or tilting is obviated or lessened.

8. A composite roof composed of three or more layers of felt or paper saturated and joined or not with asphaltum, the asphaltic or bituminous layer with gravel embedded therein, the layer of hydraulic cement or concrete made thicker at the eaves or edges of the roof, the superimposed layer of beveled tiles, laid as described, and the double stop C, the whole constructed in the manner and for the purpose herein set forth.

9. A tile for roofing and other purposes in which hydraulic cement is the principal hardening substance, in combination with a foundation of felting or paper and any kind of bitumen and sand or gravel, substantially as and for the purpose set forth.

SAMUEL L. FOSTER.
WILLIAM H. BENTON.

Witnesses:
JNO. B. LOBER,
J. O. WARREN.